(12) United States Patent
Murayama et al.

(10) Patent No.: US 10,437,273 B2
(45) Date of Patent: Oct. 8, 2019

(54) DEVICE OPERATION SETTING APPARATUS AND DEVICE OPERATION SETTING VALUE DETERMINATION PROGRAM

(71) Applicant: Kabushiki Kaisha Toshiba, Minato-ku (JP)

(72) Inventors: Dai Murayama, Musashino (JP); Masaaki Saito, Itabashi (JP); Nagako Hisada, Koganei (JP); Yutaka Iino, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 320 days.

(21) Appl. No.: 15/262,110

(22) Filed: Sep. 12, 2016

(65) Prior Publication Data

US 2016/0378128 A1 Dec. 29, 2016

Related U.S. Application Data

(63) Continuation of application No. PCT/JP2014/082039, filed on Dec. 3, 2014.

(30) Foreign Application Priority Data

Jun. 20, 2014 (JP) .................................. 2014-127613

(51) Int. Cl.
*G05F 1/66* (2006.01)
*G05D 23/19* (2006.01)
(Continued)

(52) U.S. Cl.
CPC ................ *G05F 1/66* (2013.01); *F24F 11/30* (2018.01); *F24F 11/62* (2018.01); *F24F 11/89* (2018.01);
(Continued)

(58) Field of Classification Search
CPC .................. G05F 1/66; G05D 23/1917; G05B 2219/2202; F24F 11/89; F24F 11/62;
(Continued)

(56) References Cited

U.S. PATENT DOCUMENTS

| 9,543,775 B2 | 1/2017 | Murayama et al. |
| 2007/0049133 A1* | 3/2007 | Conroy ..................... G06F 1/26 439/894 |

(Continued)

FOREIGN PATENT DOCUMENTS

| JP | 2003-161492 | 6/2003 |
| JP | 2005-157685 A | 6/2005 |

(Continued)

OTHER PUBLICATIONS

International Search Report dated Jan. 27, 2015 in PCT/JP2014/082039, filed Dec. 3, 2014 (with English Translation).

(Continued)

*Primary Examiner* — M. N. Von Buhr
(74) *Attorney, Agent, or Firm* — Oblon, McClelland, Maier & Neustadt, L.L.P.

(57) ABSTRACT

A device operation setting apparatus includes a calculator and a determiner. The calculator calculates, based at least in part on a relationship between a setting value regarding operation control of a device and a consumed power of a device, a target value of the consumed power of the device. The determiner determines the setting value to cause that a difference between an actually measured consumed power of the device and the target value of the consumed power of the device calculated by the calculator is within a prescribed range.

11 Claims, 13 Drawing Sheets

(51) Int. Cl.
*H02J 13/00* (2006.01)
*F24F 11/00* (2018.01)
*F24F 11/89* (2018.01)
*F24F 11/30* (2018.01)
*F24F 11/62* (2018.01)
*H02J 3/14* (2006.01)
*F24F 140/60* (2018.01)

(52) U.S. Cl.
CPC ............ *G05D 23/1917* (2013.01); *H02J 3/14* (2013.01); *H02J 13/00* (2013.01); *F24F 2140/60* (2018.01); *G05B 2219/2202* (2013.01); *H02J 2003/143* (2013.01); *H02J 2003/146* (2013.01); *Y02B 70/3225* (2013.01); *Y02B 70/3266* (2013.01); *Y04S 20/222* (2013.01); *Y04S 20/224* (2013.01); *Y04S 20/242* (2013.01)

(58) Field of Classification Search
CPC ........ F24F 11/30; F24F 2140/60; H02J 13/00; H02J 3/14; H02J 2003/146; H02J 2003/143; Y04S 20/242; Y04S 20/224; Y04S 20/222; Y02B 70/3266; Y02B 70/3225
See application file for complete search history.

(56) References Cited

U.S. PATENT DOCUMENTS

| | | | | |
|---|---|---|---|---|
| 2007/0222295 A1* | 9/2007 | Wareham | ........... | H02J 3/14 307/32 |
| 2007/0299562 A1* | 12/2007 | Kates | ........... | H02J 3/14 700/295 |
| 2009/0195070 A1* | 8/2009 | Takegami | ........... | H02J 3/14 307/31 |
| 2009/0211986 A1* | 8/2009 | Kates | ........... | E04H 4/129 210/742 |
| 2010/0010683 A1* | 1/2010 | Kates | ........... | H02J 3/14 700/293 |
| 2010/0225167 A1* | 9/2010 | Stair | ........... | H02J 3/14 307/29 |
| 2011/0035075 A1 | 2/2011 | Tomita et al. | | |
| 2011/0184574 A1* | 7/2011 | Le Roux | ........... | G01D 4/004 700/291 |
| 2011/0282505 A1 | 11/2011 | Tomita et al. | | |
| 2011/0314312 A1 | 12/2011 | Naffziger et al. | | |
| 2012/0239595 A1* | 9/2012 | Kiuchi | ........... | G06Q 50/06 705/412 |
| 2014/0094980 A1 | 4/2014 | Saito et al. | | |
| 2014/0163757 A1 | 6/2014 | Murayama et al. | | |
| 2014/0188295 A1 | 7/2014 | Saito et al. | | |
| 2014/0371942 A1* | 12/2014 | Matsuyama | ........... | H02J 3/14 700/297 |
| 2015/0005978 A1* | 1/2015 | Nakakita | ........... | H02J 3/14 700/297 |
| 2015/0019036 A1 | 1/2015 | Murayama et al. | | |
| 2015/0295423 A1 | 10/2015 | Murayama et al. | | |

FOREIGN PATENT DOCUMENTS

| | | |
|---|---|---|
| JP | 4396557 | 1/2010 |
| JP | 2010-166636 | 7/2010 |
| JP | 2011-36084 | 2/2011 |
| JP | 2012-163304 | 8/2012 |
| JP | 2013-174412 A | 9/2013 |
| JP | 2014-96946 A | 5/2014 |
| JP | 2014-115878 A | 6/2014 |
| JP | 2015-12783 A | 1/2015 |
| WO | WO 2011/163261 A1 | 12/2011 |
| WO | WO 2015/037307 A1 | 3/2015 |

OTHER PUBLICATIONS

Extended European Search Report dated Jan. 15, 2018 in European Patent Application No. 14894861.5, citing document AO therein. 8 pages.

* cited by examiner

FIG. 9

| ITEM | NAME OF VARIABLE |
| --- | --- |
| BOILER MAIN STEAM AMOUNT | GNoB |
| TURBINE GENERATED AMOUNT | ENoT |
| TURBINE CONDENSER COOLING WATER INTAKE TEMPERATURE | TNoTVin |
| TURBINE MODEL CONSTANTS a0 TO a7 | aNoT |
| TURBINE CONDENSER MODEL CONSTANTS a0 TO a7 | aNoTV |
| TURBINE CONDENSER FLOW AMOUNT RATING | GNoTex0 |
| TURBINE VACUUM LEVEL REFERENCE VALUE | VNoTV0 |
| TURBINE CONDENSER UPPER LIMIT MODEL CONSTANTS a0 TO a4 | cNoTV_h |
| TURBINE CONDENSER LOWER LIMIT CONSTANTS a0 TO a4 | cNoTV_l |
| TURBINE MAIN STEAM OPTIMIZED VALUE | flg_NoTOpt |
| BOILER MAIN STEAM OPTIMUM VALUE | GNoBOpt |
| TURBINE GENERATED POWER OPTIMUM VALUE | ENoTOpt |
| INFLOW AMOUNT TO CONDENSER | GNoTex |
| OPTIMUM VALUE OF INFLOW AMOUNT TO CONDENSER | GnoTexOpt |
| CONDENSER VACUUM LEVEL OPTIMUM VALUE | VNoTVOpt |
| GENERATED POWER CALCULATED VALUE | ENoTCal |
| GENERATED POWER CALEULATED OPTIMUM VALUE | ENoTOptCal |
| CONDENSER INFLOW AMOUNT CORRESPONDING TO CONDENSER VACUUM LEVEL UPPER LIMIT | GNoTex_h |
| CONDENSER INFLOW AMOUNT CORRESPONDING TO CONDENSER VACUUM LEVEL LOWER LIMIT | GNoTex_l | ns
DEVICE OPERATION SETTING APPARATUS AND DEVICE OPERATION SETTING VALUE DETERMINATION PROGRAM

TECHNICAL FIELD

Embodiments of the present invention relate to a device operation setting apparatus and a device operation setting value determination program.

BACKGROUND ART

Heat-source devices receive electrical power and generate heat. Power-source devices receive electrical power and generate electricity. Energy consumed by heat-source devices and power-source devices account for a large part of energy consumed in factories and office buildings. A device operation setting apparatus may establish the details of device operation so as to optimize the device operation. When the device operation setting apparatus receives a demand response (DR) signal, it determines a setting value regarding operation of a device, so that the actually measured value of consumed power of a device coincides with a target value. The device operation setting apparatus operates a device in response to the determined setting value. However, there are cases in which, because of device deterioration or environmental condition, the device operation setting apparatus cannot make the difference between the actually measured consumed power value of a device and the target value of the consumed power of the device in accordance with a determined setting value to be within a prescribed range.

PRIOR ART REFERENCE

Patent Reference

[Patent Reference 1]: Japanese Patent No. 4396557

SUMMARY OF THE INVENTION

Problem to be Solved by the Invention

The problem the present invention seeks to solve is that of providing a device operation setting apparatus and a device operation setting value determination program capable of making the difference between the actually measured consumed power value of a device and the target value of the consumed power of the device to be within a prescribed range.

Means to Solve the Problem

A device operation setting apparatus of an embodiment has a calculator and a determiner. The calculator, based on the relationship between a setting value regarding operation control of a device and the consumed power of the device, calculates a target value of the consumed power of the device. The determiner determines the setting value so that the difference between the actually measured consumed power of the measured device and the target value of the consumed power of the device calculated by the calculator is within a prescribed range.

BRIEF DESCRIPTION OF THE DRAWINGS

FIG. 9 shows the variable names in the second embodiment.

EMBODIMENTS

Embodiments of a device operation setting apparatus and a device operation setting value determination program will be described below, with references made to the drawings.

First Embodiment

Figure 1:
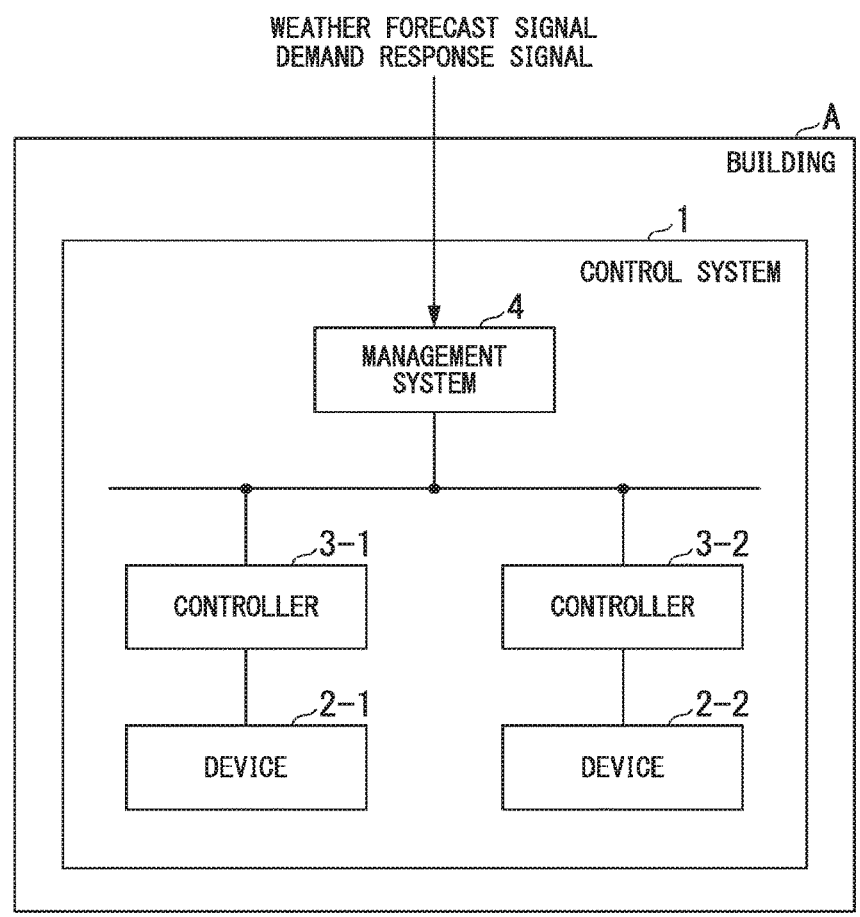
FIG. 1 shows a control system within a building in a first embodiment.

FIG. 1 shows the constitution of a control system 1 of the first embodiment. The control system 1 has a device 2, a controller 3, a management system 4 (a building/energy monitoring control apparatus). The control system 1 may have a plurality of devices 2. The control system 1 may have a plurality of controllers 3. The control system 1 may be provided in a building A or in another prescribed location other than the building A. In this control system 1, these functional blocks may be distributed and provided in a prescribed range.

Next, an example of the constitution of the control system 1 will be described.

Figure 2:
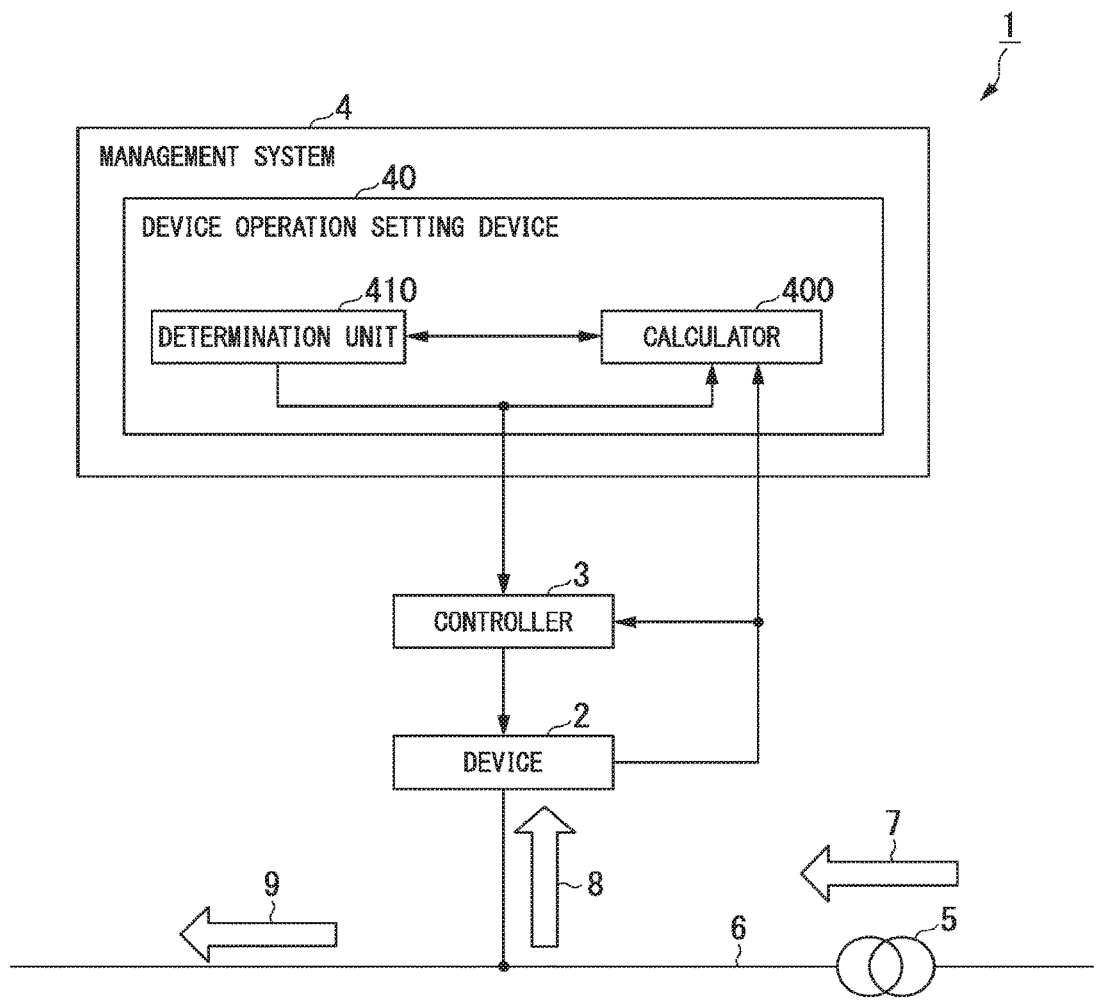
FIG. 2 shows a control system of the first embodiment.
Figure 3:
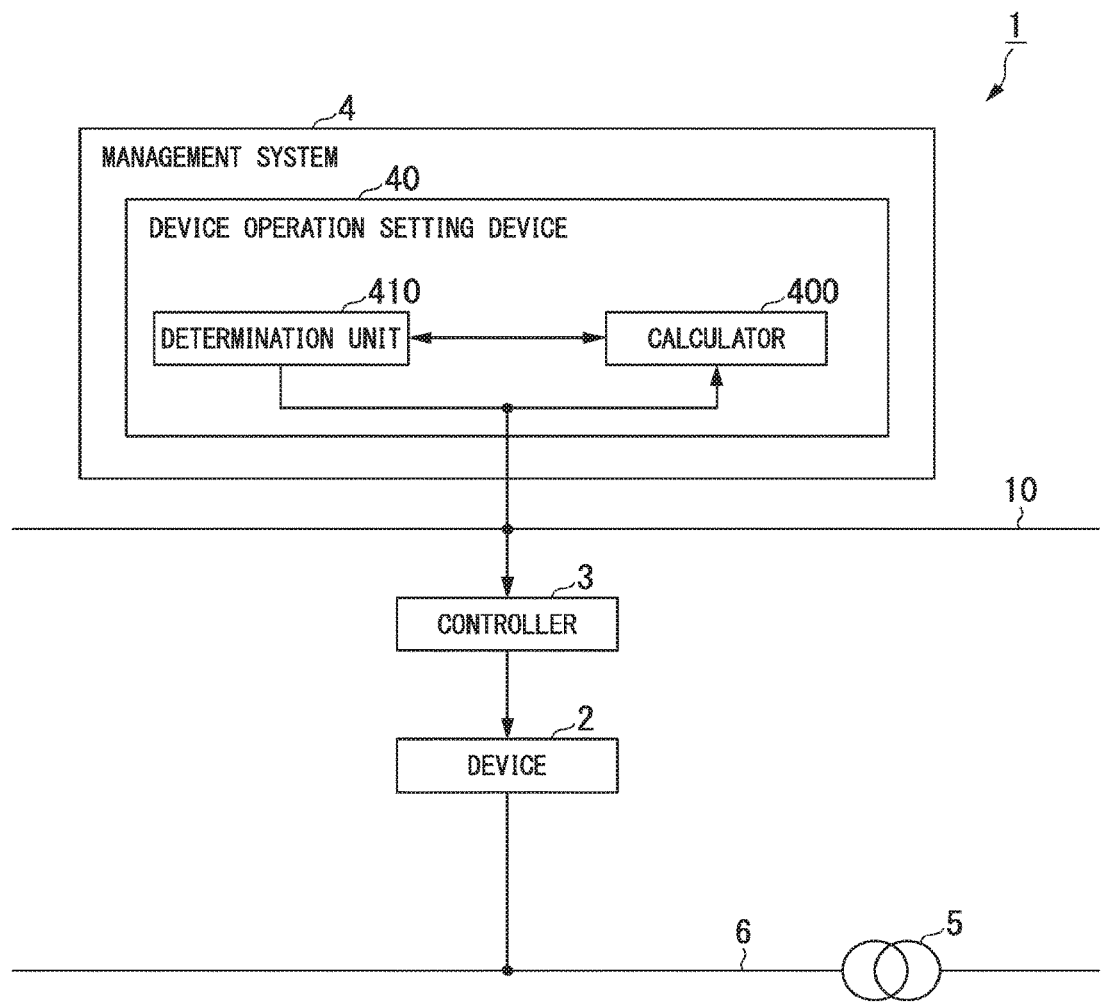
FIG. 3 shows the hardware of a control system of the first embodiment.

FIG. 2 shows the control system in the first embodiment. FIG. 3 shows the hardware of the control system of the first embodiment.

The transformer 5 is connected to the local wiring 6. The transformer 5 outputs a received electric power 7 (secondary side power) to the local wiring 6. The local wiring 6 supplies the consumed power 8 to the device 2.

The device 2 acquires the consumed power 8 via the local wiring 6. The other consumed power 9 is the power remaining when the consumed power 8 is subtracted from the received power 7. The other consumed power 9 is consumed by other power loads (not shown). The device 2 acquires a control value from the controller 3. The device 2 executes a prescribed operation based on the control value. The device 2 outputs information indicating the consumed power 8 of the device 2 or the actually measured value of generated power (sensor value) to the controller 3 and the device operation setting apparatus 40, via the communication circuit 10. The communication circuit 10 is, for example, a communication circuit within an office building. The device 2 is, for example, a power-sourcing device or an energy-sourcing device, and may be an office-automation device.

The controller 3 acquires a setting value from the management system 4, via the communication circuit 10. The controller 3 determines a control value based on the setting value. The controller 3 outputs the control value to the device 2.

The management system 4 determines the setting value based on information acquired from outside. By outputting the setting value to the controller 3, the management system 4 controls the consumed power 8, the generated power, and the amount of heat of the device 2. The management system 4, based on a demand response signal (DR signal), controls the consumed power 8, the generated power, and the amount of heat of the device 2. The demand response signal DR includes, for example, command information that controls the power or information indicating the power peak shift target. The management system 4 may, based on a weather forecast signal, control the consumed power 8, the generated power, and the amount of heat of the device 2.

The management system 4 has a calculator 400 and a determiner 410. A part or all of the calculator 400 and the determiner 410 is a software functional unit that functions by a processor such as a CPU (central processing unit) executing a program stored in memory. A part or all of these may be a hardware functional unit such as an LSI (large-scale integration) device or an ASIC (application-specific integrated circuit).

The calculator 400 has a volatile memory such as a RAM (random-access memory) or a register. The calculator 400 may have a non-volatile memory (non-temporary recording medium) such as a ROM (read-only memory), a flash memory, or a hard-disk drive. The non-volatile memory stores a program for the purpose of operating a processor such as a CPU.

The non-volatile memory stores information representing a model (hereinafter called the device model) that emulates the operation of the device 2 and the controller 3. The device model represents the relationship between the target value of the power of the device 2, which operates in accordance with the setting value, and that setting value. The device model may be expressed as a characteristics equation indicating the power and heat characteristics of the device 2, or may be expressed as a table of correspondence that establishes a correspondence between power or heat target value and the setting value of the device 2. The deterioration of the device 2 and the controller 3 or the environmental conditions may be reflected in the device model.

The calculator 400 acquires from the device 2 information indicating the device 2 consumed power 8 or generated power actual measured value (sensor value). The calculator 400 acquires from the determiner 410 a setting value acquired by the controller 3 from the determiner 410. The calculator 400 acquires a temporary setting value from the determiner 410. The temporary setting value is a setting value used by the calculator 400 to calculate the target value, based on the device model. The calculator 400 calculates the consumed power value (hereinafter called the temporary consumed power value) of the device 2 for the case of operation in accordance with the temporary setting value, based on the device model. The calculator 400 outputs information indicating the temporary consumed power value to the determiner 410.

The characteristics equation of the device model may be any type of equation. An example of a first characteristics equation representing the device model is represented by Equation (1).

$$y1 = a \times x1 + b \quad (1)$$

In the above, x1 is the temporary setting value, y1 is the provisional value of the temporary consumed power of the device 2, and a and b are constants.

An example of a second characteristics equation representing the device model is represented by Equation (2).

$$y2 = a \times x2 + b \quad (2)$$

In the above, x2 is a value associated with the control value, y2 is an actually measured value of the consumed power of the device 2, and a and b are constants.

An example of a third characteristics equation representing the device model is represented by Equation (3).

$$y3 = a \times x3 + b \quad (3)$$

In the above, x3 is a setting value, y3 is a value associated with the actually measured value of the consumed power of the device 2, and a and b are constants.

As described above, the device model emulates the operation of the device 2 and the controller 3.

If there is no error in the emulation of the operation of the device 2 and the controller 3, the actually measured value y2 of the consumed power of the device 2 and the value y3 associated with the actually measured value of consumed power of device 2 coincide. In this case, the value x2 associated with the control value and the setting value x3 coincide.

If there is an error in the emulation of the operation of the device 2 and the controller 3, even if the determiner 410 outputs the temporary setting value x1 indicated by Equation (1) to the controller 3, the actually measured value of the consumed power of the device 2 and the provisional value y1 of the temporary consumed power of the device 2 will not coincide.

Given this, the calculator 400 performs correction so as to make the error between the temporary consumed power value based on the provisional value y1 of the temporary consumed power and the actually measured value y2 of the consumed power small. For example, the calculator 400, by adding a correction value Δy to the provisional value y1 of the temporary consumed power of the device 2, corrects the error with respect to the actually measured value y2 of the consumed power of the device 2. The calculator 400 may, by subtracting the correction value Δy from the provisional value y1 of the temporary consumed power of the device 2 or multiplying or dividing the provisional value y1 of the temporary consumed power of the device by the correction value Δy, correct the error with respect to the actually measured value y2 of the consumed power of the device 2. The correction value Δy is represented by Equation (4).

$$\Delta y = y2 - y3 = y2 - (a \times x3 + b) \quad (4)$$

The calculator 400 establishes the value obtained by adding the provisional value y1 of the temporary consumed power of the device 2 and the correction value Δy as the temporary consumed power value of the device 2. The calculator 400 outputs information indicating the temporary consumed power value to the determiner 410.

The determiner 410 acquires information indicating the temporary consumed power value from the calculator 400. The determiner 410 calculates the optimal setting value, based on the temporary consumed power value. The optimal setting value is, for example, is the setting value for which the energy cost is minimum. The determiner 410 may calculate the optimal setting value by any method, and there is no restriction to any particular calculation method. For example, the determiner 410 establishes the setting value so that the setting value is within a first range (upper and lower limits). For example, the determiner 410 establishes the setting value so that the temporary consumed power value (target value) is within a second range (upper and lower limits). The determiner 410 outputs the optimal setting value to the calculator 400 and the controller 3. The determiner 410 may calculate the optimal setting value as a prescribed period. The prescribed period may be, for example, a period of 24 hours, or a period of 10 minutes.

Figure 4:
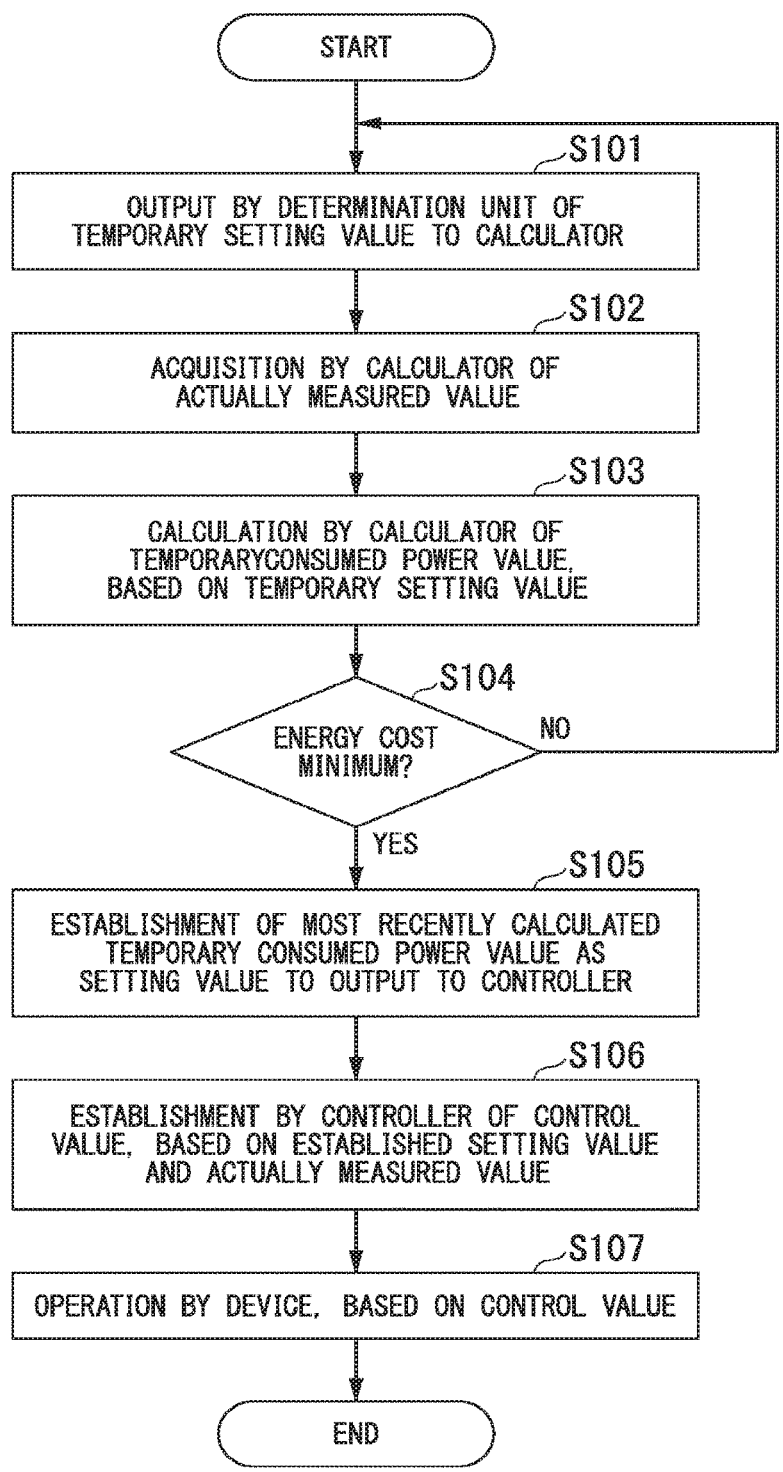
FIG. 4 shows the operation of a control system of the first embodiment.

FIG. 4 shows the operation of the control system 1 of the first embodiment.

The determiner 410 outputs a temporary setting value to the calculator 400 (step S101).

The calculator 400 acquires from the device 2 information indicating the actually measured value of the power of the device 2 (step S102).

The calculator 400 calculates the temporary consumed power value of the device 2, based on the actually measured vale of the power, the temporary setting value and the device model of the device 2 (step S103).

The determiner 410 determines whether the energy cost of the calculated temporary consumed power value is minimum (step S104). If the energy cost is not minimum (NO at step S104), the determiner 410 returns processing to step S101. If the energy cost is minimum (YES at step S104), the determiner 410 establishes the most recently calculated temporary consumed power value as the setting value to output to the controller 3. The determiner 410 outputs the established setting value to the controller 3 (step S105).

The controller 3 establishes the control value, based on the established setting value and the actually measured value of the power of the device 2. The controller 3 outputs the control value to the device 2 (step S106).

The device 2 operates based on the control value (step S107). The difference between the actually measured value of the power of the device 2 and the target value of the power of the device 2 is kept within a prescribed range.

Figure 5:
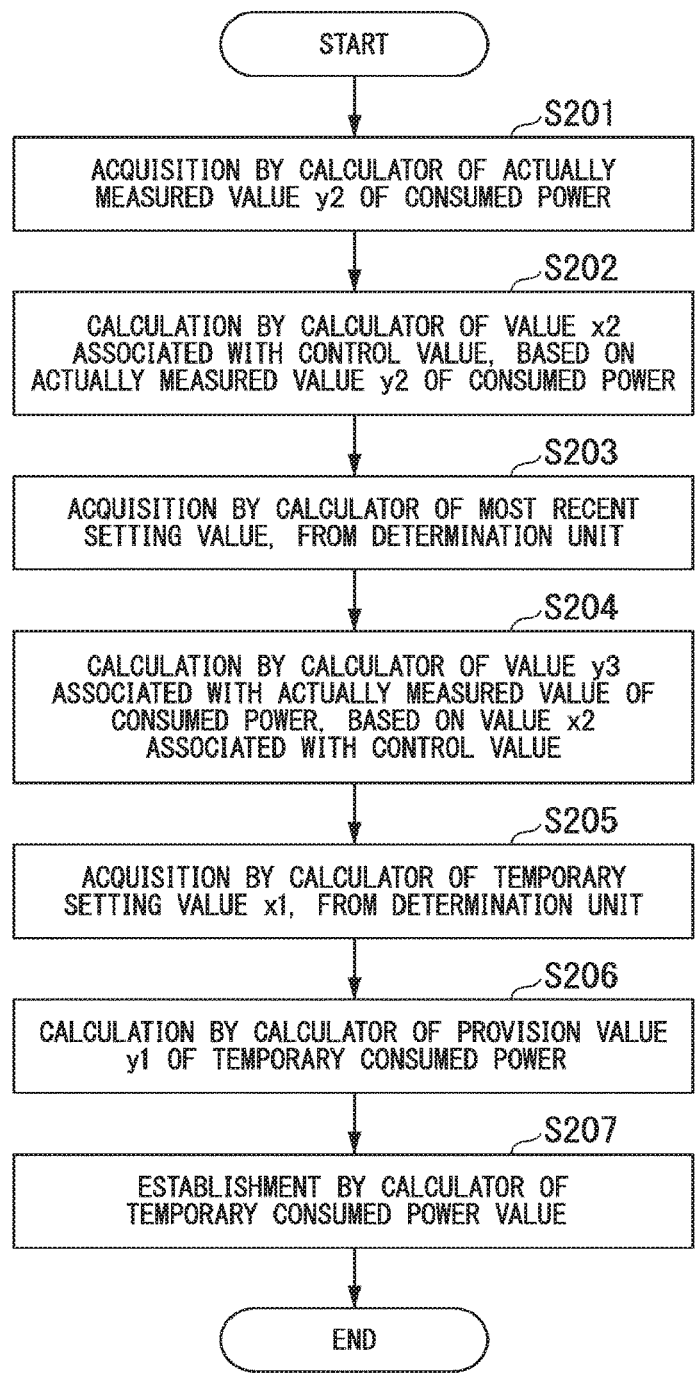
FIG. 5 shows the operation of the calculator of the first embodiment.

FIG. 5 shows the operation of the calculator 400 of the first embodiment.

The calculator 400 acquires the actually measured value y2 of the consumed power (step 201).

The calculator 400, calculates the value x2 associated with the control value, based on the actually measured value y2 of the consumed power (step S202).

The calculator 400 acquires the most recent setting value x2 from the determiner 40 (step S203).

The calculator 400 calculates the value y3 associated with the actually measured value of the consumed power, based on the value x2 associated with the control value (step S204).

The calculator 400 acquires the temporary setting value x1 from the determiner 410 (step S205).

The calculator 400 calculates the provisional value y1 of the temporary consumed power (step S206).

The calculator 400 establishes the value obtained by adding the provisional value y1 of the temporary consumed power of the device 2 and the correction value Δy as the temporary consumed power value of the device 2. The calculator 400 outputs information indicating the temporary consumed power value to the determiner 410 (step S207).

Figure 6:
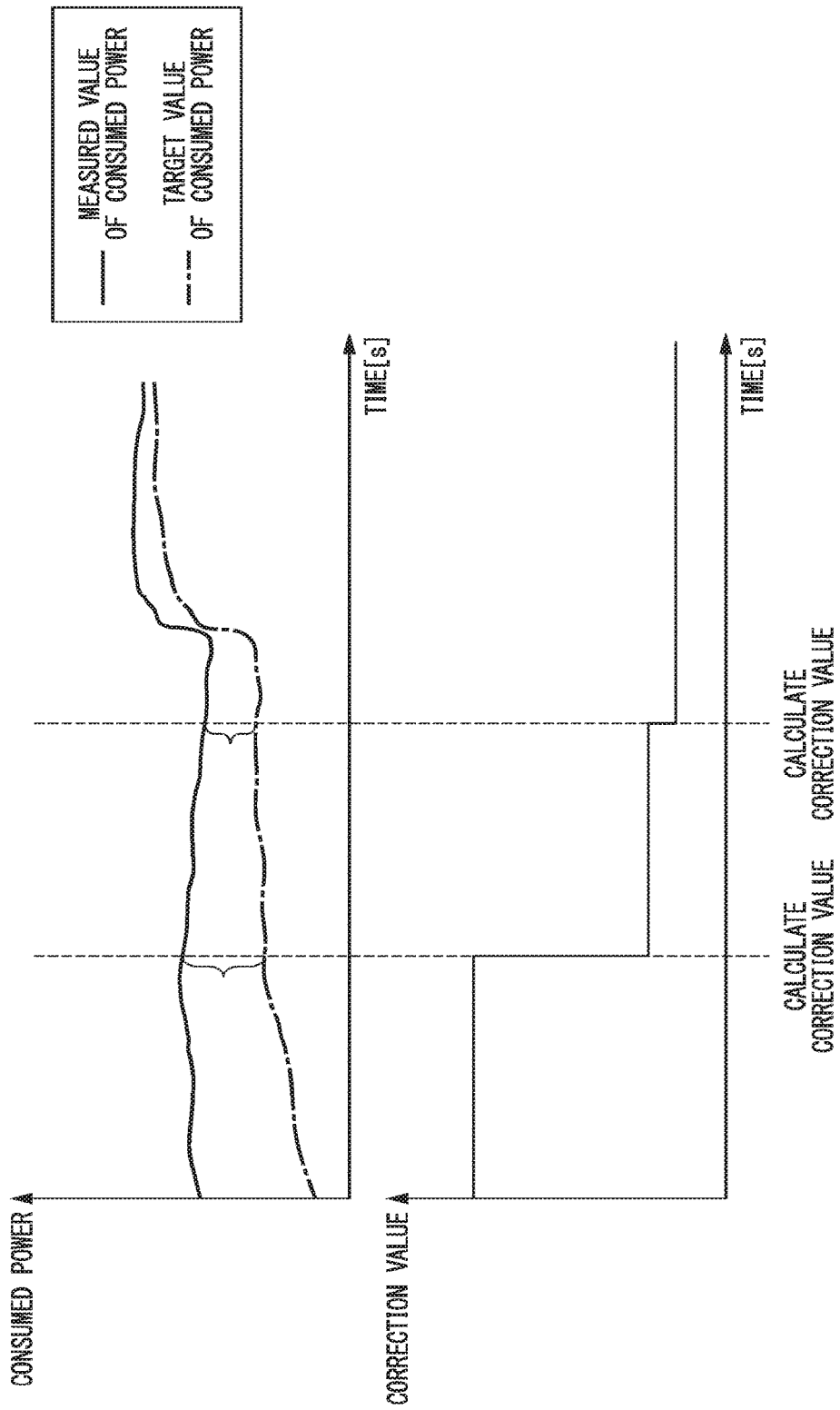
FIG. 6 shows the change of the consumed power in the first embodiment.

FIG. 6 shows the change of the consumed power in the first embodiment. The horizontal axis of the top graph in FIG. 6 represents time, the vertical axis represents the consumed power, the solid line represents the actually measured value of the consumed power of the device 2, and the single dot-dash line represents the target value of the consumed power of the device 2. In the bottom graph in FIG. 6, the vertical axis represents the correction value Δy, and the horizontal axis represents time.

If there is an error between the device model and the operation of the device 2, the temporary consumed power value (target value) based on the provisional value y1 of the temporary consumed power of the device 2 and the actually measured value y2 of the consumed power of the device 2 will not coincide.

The calculator 400 acquires information indicating the temporary consumed power value (target value) based on the provisional value y1 of the temporary consumed power of the device 2 and information indicating the error of the actually measured value y2 of the consumed power of the device 2, either at a prescribed interval or at an arbitrary time. The calculator 400 calculates the correction value Δy of the consumed power, based on this acquired information.

The calculator 400 may calculate the correction value Δy of the consumed power based on the average value of the temporary setting value x1, or based on average value of the actually measured value y2 of the consumed power of the device 2, which case the calculator 400 can suppress variation in the correction value Δy.

In this manner, the device operation setting apparatus 40 of the first embodiment has a calculator 400 and a determiner 410. The calculator 400 calculates the target value of the consumed power of the device 2 based on the relationship between the setting value regarding operation control of the device 2 and the consumed power of the device 2. The determiner 410 determines the setting value so that the difference between the actually measured value of the consumed power of the device 2 and the target value of the consumed power of the device 2, which is calculated by the calculator 400, is within a prescribed range. The same applies to generated power.

A device operation setting value determination program of the first embodiment causes a computer to execute a procedure that calculates a target value of the consumed power of the device 2, based on the relationship between the setting value regarding operation control of the device 2 and the consumed power of the device 2. The device operation setting value determination program of the first embodiment causes a computer to execute a procedure to determine a setting value so that the difference between the actually measured value of the consumed power of the device 2 and the calculated target value of the consumed power of the device 2 is within a prescribed range.

By this constitution, the calculator 400 calculates the target value of the consumed power of the device 2, based on the relationship between the setting value regarding operation control of the device 2 and the consumed power of the device 2. This enables the device operation setting apparatus 40 and the device operation setting value determination program of the first embodiment to make the difference between the actual measured value of the power of the device 2 and the target value of the power of the device 2 within a prescribed range.

Second Embodiment

In the second embodiment, the provision of an electric generator 2a at the device 2 in the control system 1 is the point of difference with respect to the first embodiment. In the second embodiment, only the point of difference with respect to the first embodiment will be described.

Figure 7:
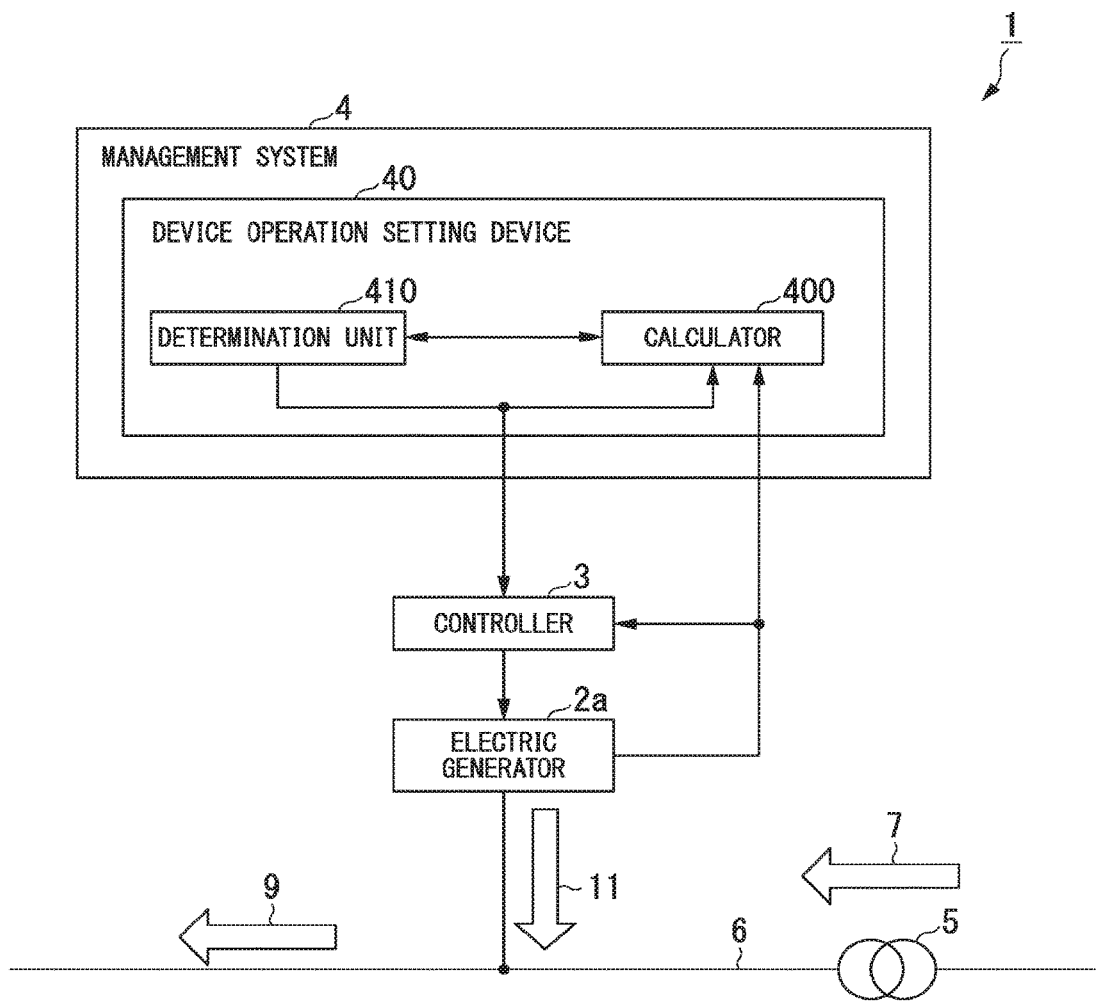
FIG. 7 shows a control system of a second embodiment.

FIG. 7 shows a control system 1 of the second embodiment. The control system 1 has an electric generator 2a as the device 2, a controller 3, and a management system 4. The electric generator 2a outputs generated power 11 via the local wiring 6. The other consumed power 9 is power that is the sum of the received power 7 and the generated power 11.

Figure 8:
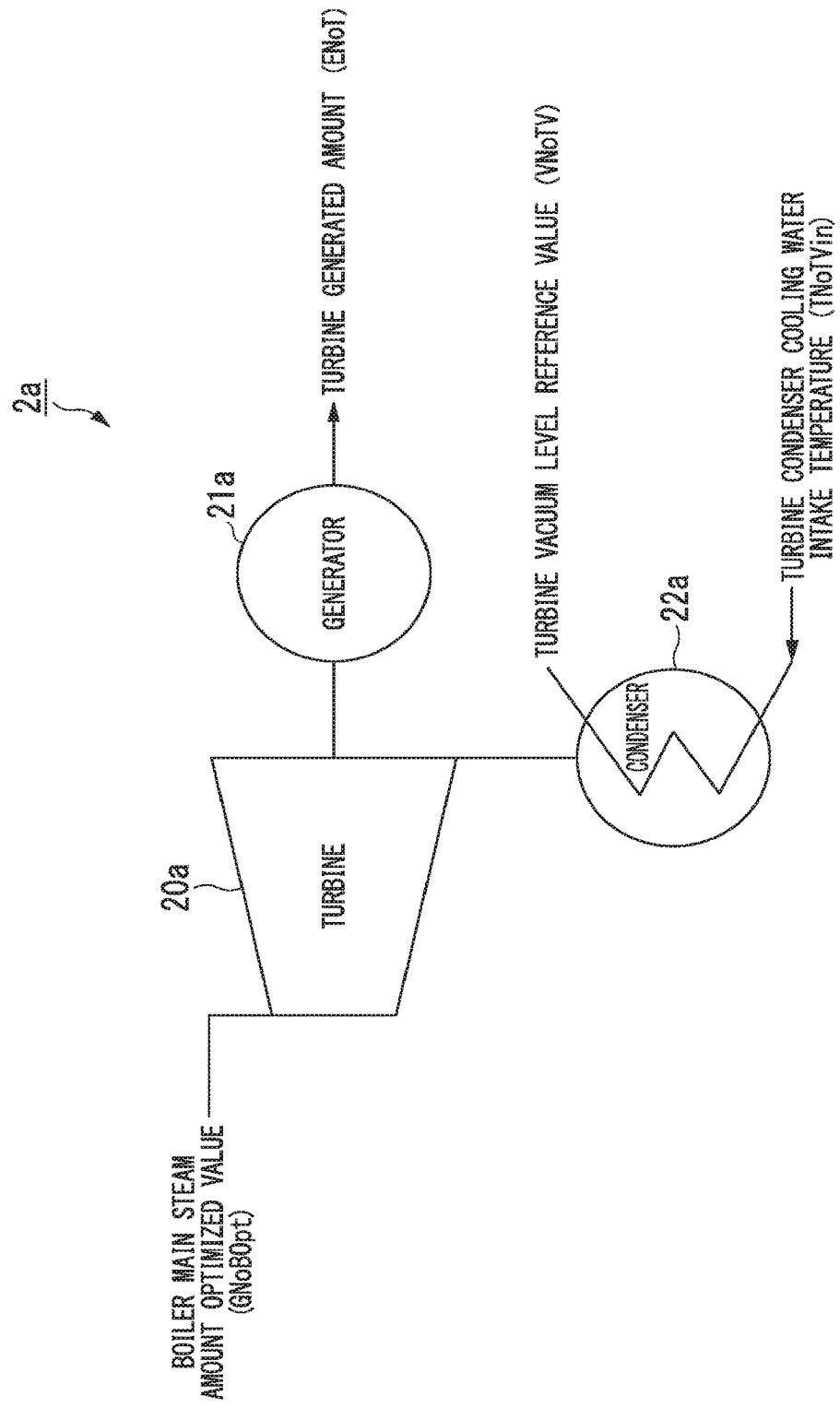
FIG. 8 shows an electric generator in the second embodiment.

FIG. 8 shows the electric generator 2a of the second embodiment. The electric generator 2a has a turbine 20a, a generator 21a, and a condenser 22a. The turbine 20a drives the generator 21a by steam from a boiler (boiler main steam amount optimized value (GnoBOpt)). The generator 21a generates electricity in response to drive by the turbine 20a (turbine generated amount (ENoT)). The condenser 22a cools the steam that has flowed from the turbine 20a (turbine condenser cooling water intake temperature (TNoTVin), turbine vacuum level reference value (VNoTV)), changing it to water.

In the following, the device model in the second embodiment will be called the generator model, the temporary consumed power value calculated based on the generator model will be called the current state value, and the optimum setting value determined based on the generator model will be called the optimum value.

FIG. 9 shows the variable names in the second embodiment. The name of the variable representing boiler main steam amount (main steam flow amount) is GNoB. The name of the variable representing the generated power of the turbine 20a is ENoT. The name of the variable representing the condenser cooling water intake temperature (cooling water) of the turbine 20a is TNoVin. The name of the variable representing the modeling constants a0 to a7 of the turbine 20a is aNoT. The name of the variable representing the condenser model constants a0 to a7 of the turbine 20a is aNoTV.

The name of the variable representing the condenser flow amount rating of the turbine 20a is GNoTex0. The name of the variable representing the vacuum level reference value of the turbine 20a is VNoTV0.

The name of the variable representing the turbine 20a condenser upper limit model constants a0 to a4 is cNoTV_h. The name of the variable representing the turbine 20a condenser lower limit constants a0 to a4 is cNoTV_1. The name of the variable representing the turbine 20a main steam optimized item is flg_NoTOpt. The name of the variable representing the boiler main steam amount optimum value is GNoBOpt. The name of the variable representing the turbine 20a generated power optimum value is ENoTOpt.

The name of the variable representing the inflow amount to the condenser 22a is GNoTex. The name of the variable representing the optimum value of the inflow amount to the condenser 22a is GnoTexOpt. The name of the variable representing the condenser 22a vacuum level optimum value is VNoTVOpt. The name of the variable representing the generated power calculated value is EnoTCal. The name of the variable representing the generated power optimum calculated value is ENoTOptCal. The name of the variable representing the condenser inflow amount corresponding to the condenser 22a vacuum level upper limit is GNoTex_h. The name of the variable representing the condenser inflow amount corresponding to the condenser 22a vacuum level lower limit is GNoTex_1.

The name of the variable representing the generated power is ENoB. The name of the variable representing the vacuum level is VNoTV. The name of the variable representing the air flow amount optimum value is NoBOpt. The name of the variable representing the generated power optimum value is EnoBOpt.

The inflow amount to the condenser 22a is the same as the main steam amount. The calculator 400 substitutes the value of the variable GNoB representing the boiler main steam amount (main steam flow amount) into the variable GNoTex representing the inflow amount to the condenser 22a. The calculator 400 substitutes the value of the variable representing the boiler main steam amount optimum value into the variable GnoTexOpt representing the optimum inflow amount value to the condenser 22a. The steam consumption characteristics of the turbine 20a are expressed by Equation (5), using the Δ(vacuum level) (vacuum level–vacuum level reference value).

$$\text{Main steam amount} = a0 + a1 \times \text{Generated power} + a2 \times \Delta(\text{vacuum level}) \quad (5)$$

Equation (5) also applies with respect to either the current state value or the optimum value. However, when the main steam amount, the generated power, and the Δ(vacuum level) (vacuum level–vacuum level reference value) are all actually measured values, because of the error (generator model error) of the emulation of the operation of the electric generator 2a and the controller 3 and the sensor measurement error, Equation (5) is not satisfied. The general power amount is not a target directly manipulated, such as at the operating end. Given this, the variable ENoTCal representing the generated power calculated value and the variable ENoTOptCal representing the calculated generated power optimum value are used in place of the actually measured values. These variables are for satisfying Equation (5). The turbine 20a characteristics are expressed by Equation (6) and Equation (7).

$$GNoBOpt = aNoT[0] + aNoT[1] \times ENoTOptCal + aNoT[2] \times (VNoTVOpt - VNoTV0) \quad (6)$$

$$GNoB = NoT[0] + aNoT[1] \times ENoTCal + aNoT[1] \times (VNoTV - VNoTV0) \quad (7)$$

If the deviation between the variable ENoTCal representing the generated power calculated value and the power generated optimum calculated value variable ENoTOptCal is the same as the actual deviation in generated power, the power generated optimum value variable ENoTOpt is expressed by Equation (8).

$$ENoTOpt = ENoT + (ENoTOptCal - ENoTCal) \quad (8)$$

The calculator 400 calculates the steam consumption characteristics, based on the variable VNoTVOpt that represents the condenser 22a vacuum level optimum value. The calculator 400 calculates the variable VNoTVOpt based on a line that represents the predicted performance.

Figure 10:
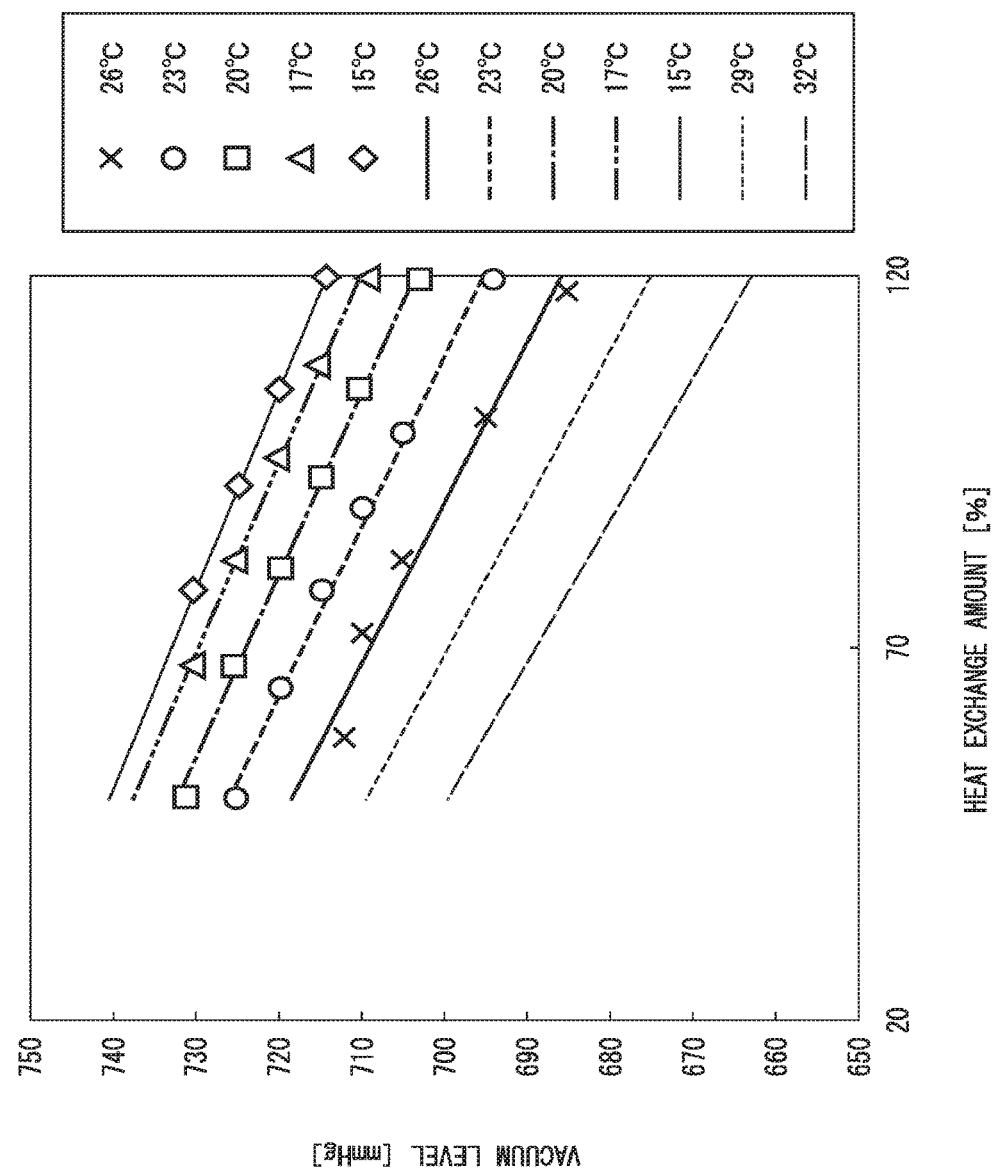
FIG. 10 shows lines representing the performance of predicting the vacuum level in a condenser in the second embodiment.

FIG. 10 shows lines representing the performance of predicting the vacuum level in a condenser 22a in the second embodiment. The vertical axis represents the vacuum level (%) and the horizontal axis represents the amount of heat exchange (mmHg). The value of the vacuum level may be approximated by a straight line, or by a curved line. Equation (9) shows one example of the approximate vacuum level value, in which av0 is an arbitrary constant.

$$\text{Vacuum level} = av0 + av1 \times \text{cooling water intake temperature} + av2 \times \text{amount of heat exchange} + av3 \times \text{cooling water intake temperature} \times \text{cooling water intake temperature} + av4 \times \text{cooling water intake temperature} \times \text{amount of heat exchange} \quad (9)$$

The condenser 22a is highly dependent upon the outside air temperature. For that reason, the assumption is made that the cooling water intake temperature does not vary near the point at which the operating point reaches the optimum point. Equation (9) is satisfied even after reaching the optimum point.

$$\begin{aligned}\text{Vacuum level optimum value} =& av0 + av1 \times \text{cooling} \\ & \text{water intake temperature} + av2 \times \text{amount of heat} \\ & \text{exchange optimum value} + av3 \times \text{cooling water} \\ & \text{intake temperature} \times \text{cooling water intake temperature} + av4 \times \text{cooling water intake temperature} \times \\ & \text{amount of heat exchange optimum value} \end{aligned} \quad (10)$$

From Equations (9) and (10), Equation (11) is satisfied.

$$\begin{aligned}(\text{Vacuum level optimum value} - \text{vacuum level}) =& (av2 + av4 \times \text{cooling water intake temperature}) \times \text{amount} \\ & \text{of heat exchange optimum value} \end{aligned} \quad (11)$$

Equation (11) is a calculated value based on design data. For that reason, there is an error between the calculated value indicated by Equation (11) and the actually measured vacuum level value. To correct this error, the calculator 400 assumes that the amount of heat exchange is proportional to the condenser inflow amount with respect to the heat exchange amount rating, and calculates the variable VNoTVOpt indicating the optimum vacuum level value of the condenser 22a. That is, the calculator 400 assumes that change in the vacuum level in the design data is the same as the change in the vacuum level at the actual operating point, and determines whether Equation (12) is satisfied.

$$VNoTVOpt = VNoTV + (aNoTV[2] + aNoTV[5] \times TNoTVin) \times ((GNoTexOpt - GNoTex)/GNoTex0) \quad (12)$$

When a value is subject to optimization, an upper limit value and a lower limit value is established. If the associated operating end is subjected to optimization, an upper limit value of GNoB_1 and a lower limit value of GNoB_h are established for the reheat steam amount optimum value GNoBrhOpt. The same applies to the generated power optimum value EnoTOpt and the condenser inflow amount optimum value GNoTexOpt. In Equation (13), the operator <= indicates the equality comparison operator "less than or equal to."

$$GNoB\_1 <= GNoROpt <= GNoB\_h \quad (13)$$

Figure 11:
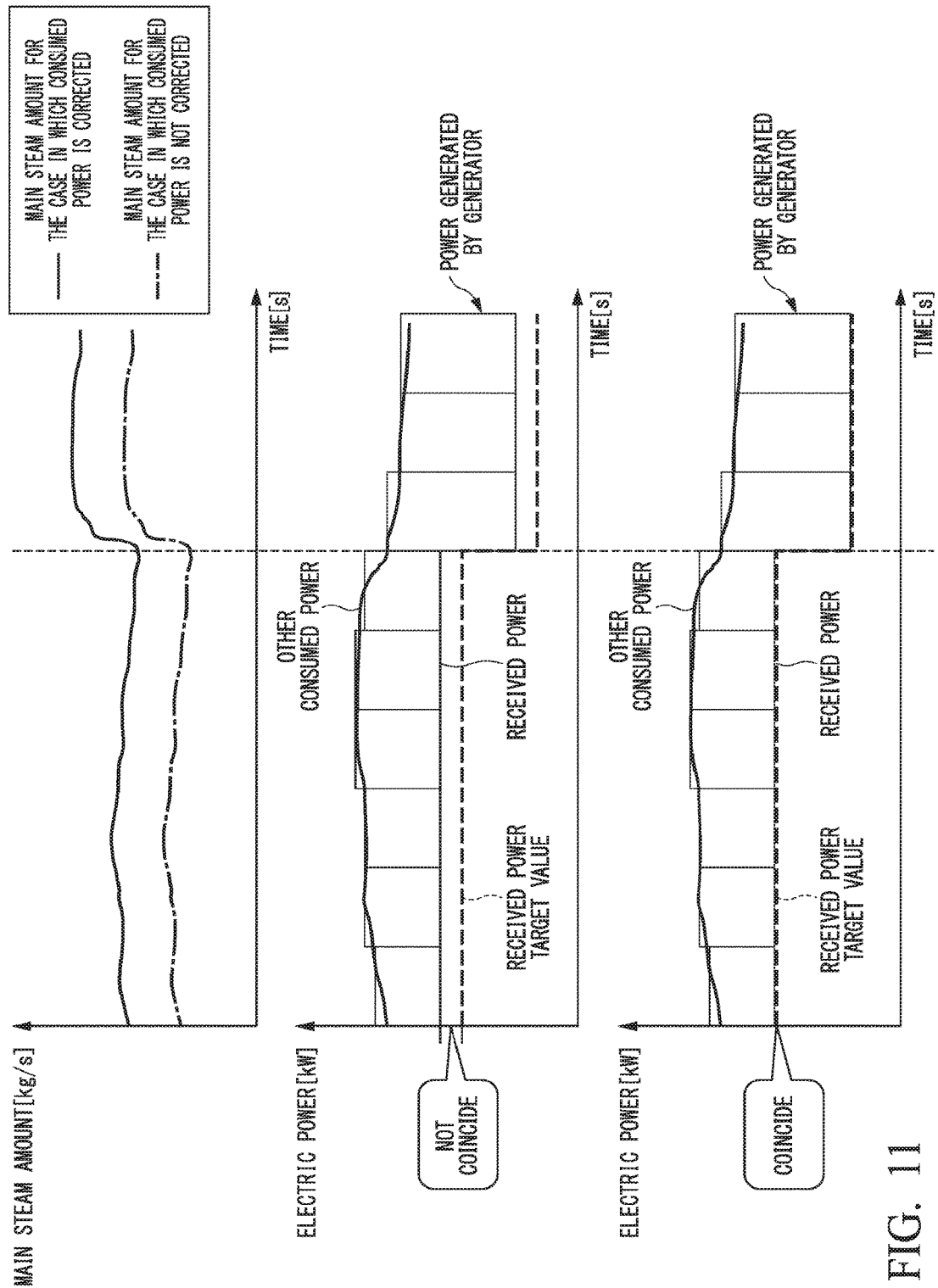
FIG. 11 shows the variation of the amount of electrical generation of an electric generator in the second embodiment.

FIG. 11 shows the variation of the amount of power generated by the electric generator 2a in the second embodiment. In the upper graph, the vertical axis represents the main steam amount (kg/s) to the turbine 20a. In the middle graph, the vertical axis represents the electric power (kW). In the lower graph, the vertical axis represents the electric power (kW). The horizontal axes in the upper, middle, and lower graphs represent time. In the following, the received power amount will be called the received power, and the target value of the received power will be called the received power target value.

The upper graph of FIG. 11 shows the main steam amount for the case in which the consumed power is corrected and the main steam amount for the case in which the consumed power is not corrected. There is a difference between the main steam amount for the case in which the calculator 400 corrects the consumed power and the case in which it does not correct the consumed power. If the consumed power is not corrected, as seen in the middle graph in FIG. 11, the received power 7, which is the other consumed power 9 minus the generated power, and received power target value do not coincide, because of the error in the generator model.

If the consumed power is not corrected, as shown in the lower graph in FIG. 11, the received power 7, which is the other consumed power 9 minus the generated power, and received power target value (temporary consumed power value) coincide.

The degree of coincidence is dependent on the error of the generator model. The calculator 400 calculates the consumed power correction value, based on the actually measured generated power, the setting value (main steam amount setting value), and the generator model.

By doing this, the determiner 410 causes the received power 7 and the received power target value to coincide.

As noted above, the device operation setting apparatus 40 of the second embodiment has a calculator 400 and a determiner 410. The calculator 400 calculates the consumed power target value of the electric generator 2a, based on the relationship (generator model) between the setting value regarding operation control of the electric generator 2a and the consumed power of the electric generator 2a. The determiner 410 determines the setting value so that the difference between the actually measured value of the consumed power of the electric generator 2a and the consumed power target value of the electric generator 2a calculated by the calculator 400 is within a prescribed range.

The device operation setting value determination program of the second embodiment causes a computer to execute a procedure to calculate the consumed power target value of the electric generator 2a, based on the relationship (generator model) between the setting value regarding operation control of the electric generator 2a and the consumed power of the electric generator 2a. The device operation setting value determination program of the second embodiment also causes a computer to execute a procedure to determine a setting value so that the difference between the actually measured value of the consumed power of the electric generator 2a and the consumed power target value of the electric generator 2a calculated by the calculator 400 is within a prescribed range.

By this constitution, the calculator 400 calculates the consumed power target value of the electric generator 2a, based on the relationship between the setting value regarding operation control of the electric generator 2a and the consumed power of the electric generator 2a. This enables the device operation setting apparatus 40 and the device operation setting value determination program of the second embodiment to make the difference between the actually measured value of the generated power of the electric generator 2a and the generated power target value of the electric generator 2a be within a prescribed range.

Third Embodiment

In the third embodiment, the provision of an electric freezer 2b as the device 2 in the control system 1 is the point of difference with respect to the first embodiment and the second embodiment. In the third embodiment, only the point of difference with respect to the first embodiment and the second embodiment will be described.

Figure 12:
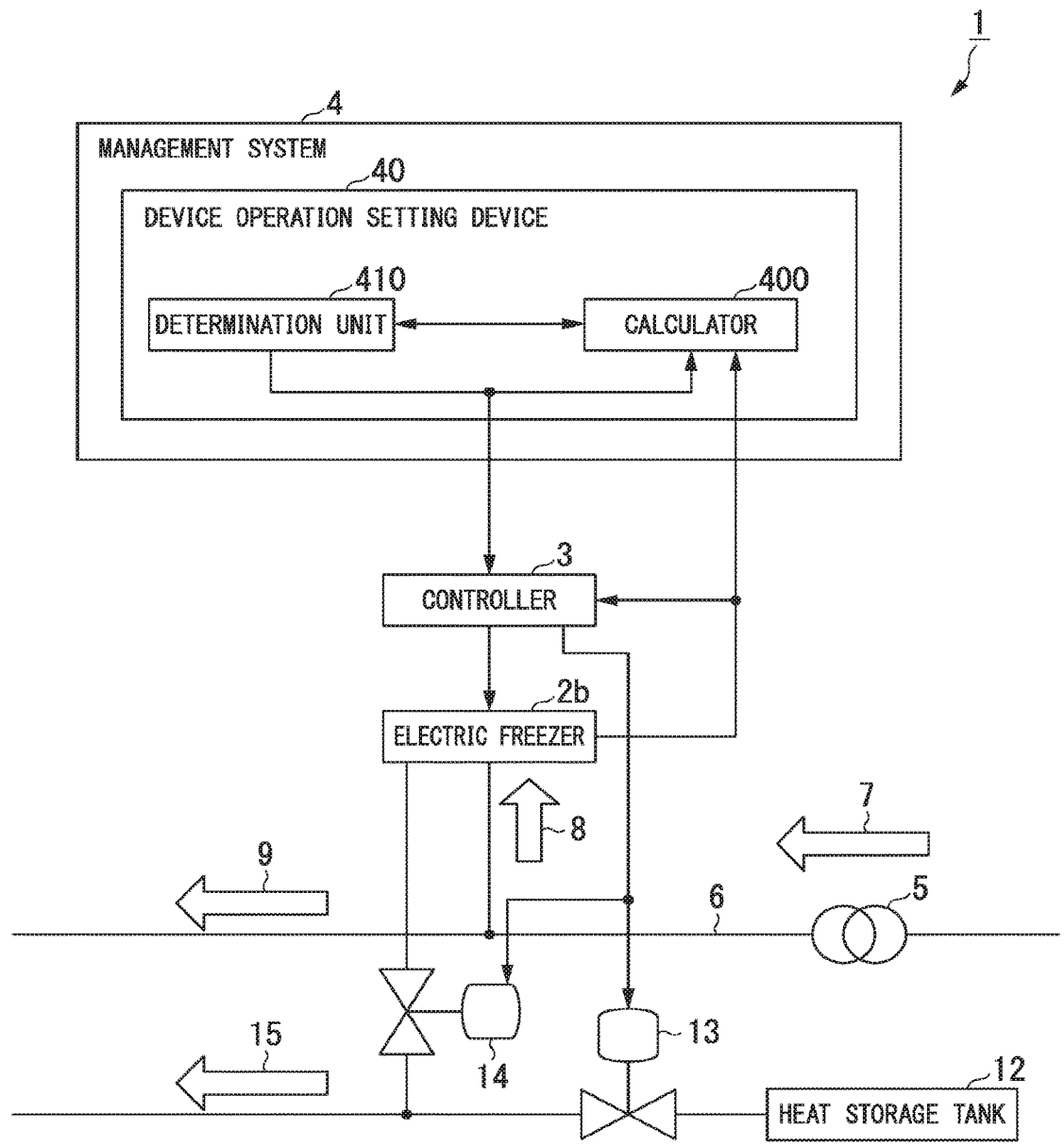
FIG. 12 shows a control system in a third embodiment.

FIG. 12 shows the control system 1 of the third embodiment. The control system 1 has an electric freezer 2b as the device 2, a controller 3, and a management system 4. The controller 3 controls the opening of a valve 13 in response to a control value for the valve 13. The controller 3 controls the opening of a valve 14 in response to a control value for the valve 14. In the following the term "cooling heat" may be understood to be warming heat.

A heat storage tank 12 outputs cooling/warming heat to the cooling/warming load, via the valve 13. To simplify the description, in the following the assumption will be made that a sufficient amount of cooling/warming heat is stored in the heat storage tank 12. Even if this assumption is made, generality is not lost. This is because the heat storage tank 12 may store a sufficient amount of cooling/warming heat beforehand, by the electric freezer 2b or the like.

The electric freezer 2b acquires consumed power 8 via local wiring 6. The electric freezer 2b outputs cooling water to the cooling/warming load, via the valve 14. The cooling water output by the electric freezer 2b and the cooling/warming heat output by the heat storage tank 12 merge, becoming the cooling/warming heat 15. The cooling/warming heat 15 is supplied to the cooling/warming heat load. In the following, the device model in the third embodiment will be called the electric freezer model.

If the other consumed power 9 is fixed, the determiner 410 adjusts the received power 7 so that the received power 7 and the received power target value are made to coincide. The determiner 410 adjusts the consumed power 8 of the electric freezer 2b to enable adjustment of the received power 7. The consumed power 8 of the electric freezer 2b is not something that can be directly manipulated at an operating end, such as the valve 13 or the valve 14. The consumed power 8 of the electric freezer 2b differs, depending upon the load (hereinafter "cooling water load") of the cooling water. For that reason, the determiner 410 appropriately controls the operating end, such as the valve 13 or the valve 14, so as to control the consumed power 8 of the electric freezer 2b.

The calculator 400 calculates the consumed power correction value, based on the actually measured value of the consumed power, the setting value, and the electric freezer model. By doing this, the determiner 410 causes the received power 7 and the received power target value to coincide. Because of the error of the electric freezer model, the consumed power 8 of the electric freezer 2b calculated using the electric freezer model and the actually measured value of the consumed power 8 of the electric freezer 2b do not coincide. The calculator 400 calculates the correction value of the consumed power, based on the actually measured value of the consumed power, the setting value (cooling water load), and the electric freezer model. By doing this, the determiner 410 causes the received power 7 and the received power target value to coincide.

Figure 13:
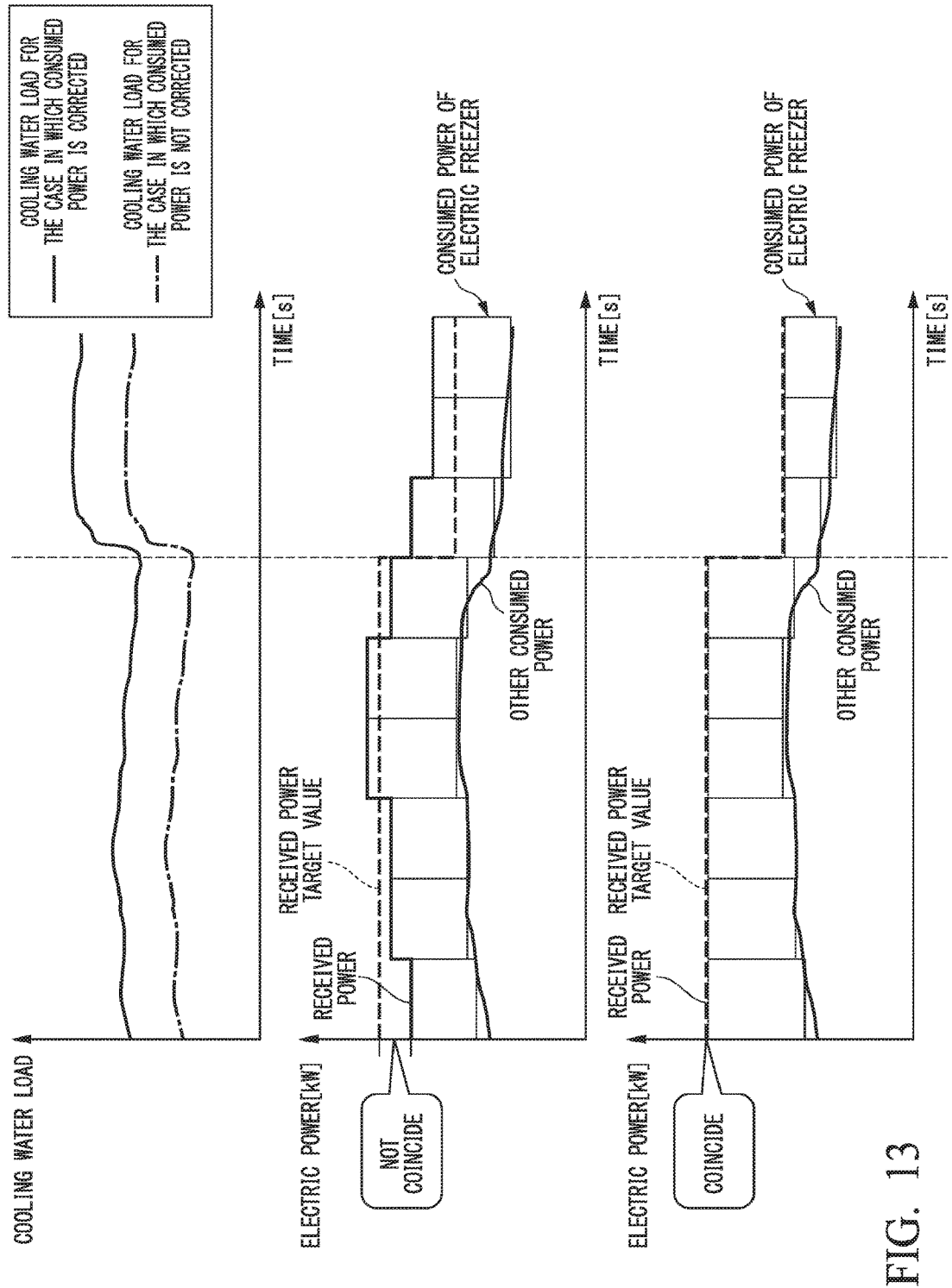
FIG. 13 shows the variation of the amount of consumed power in an electric freezer in the third embodiment.

FIG. 13 shows the variation of the consumed power of the electric freezer 2b in the third embodiment. In the upper graph, the vertical axis represents the cooling water load of the electric freezer 2b. In the middle and lower graphs, the vertical axis represents the power (kW). The horizontal axes in the upper, middle, and lower graphs represent time.

The upper graph of FIG. 13 shows the cooling water load for the case in which the consumed power is corrected and the cooling water load for the case in which the consumed power is not corrected. There is a difference between the cooling water load for the case in which the calculator 400 corrects the consumed power and the cooling water load for the case in which the consumed power is not corrected. If the consumed power is not corrected, as shown in the middle graph of FIG. 13, because of the error of the electric freezer model, the received power, which is the sum of the other consumed power 9 and the consumed power 8, and the received power target value do not coincide.

If the consumed power is not corrected, as shown in the lower graph of FIG. 13, the received power 7, which is the sum of the other consumed power 9 and the consumed power 8, and the received power target value (temporary consumed power value) coincide. The degree of coincidence is dependent on the error of the electric freezer model. The calculator 400 calculates the consumed power correction value, based on the actually measured consumed power, the setting value (cooling water load), and the electric freezer model. By doing this the determiner 410 causes the received power 7 and the received power target value to coincide.

The determiner 410 may determine whether, by changing the setting value, the difference between actually measured power of the electric freezer 2b and the target value can be made to be within a prescribed range. If the cooling/warming heat 15 supplied to the cooling/warming load is insufficient, the heat storage tank 12 may increase the amount of cooling/warming heat output to the cooling/warming load. In this case, the controller 3 adjusts the opening of the valve 13, based on a control value responsive to the setting value.

As noted above, the device operation setting apparatus 40 of the third embodiment has a calculator 400 and a determiner 410. The calculator 400 calculates the consumed power target value of the electric freezer 2b, based on the relationship (electric freezer model) between the setting value regarding operation control of the electric freezer 2b and the consumed power of the electric freezer 2b. The determiner 410 determines the setting value so that the difference between the actually measured consumed power of the electric freezer 2b and the consumed power target value of the electric freezer 2b calculated by the calculator 400 is within a prescribed range.

The device operation setting value determination program of the third embodiment causes a computer to execute a procedure to calculate the consumed power target value of the electric freezer 2b, based on the relationship (electric freezer model) between the setting value regarding operation control of the electric freezer 2b and the consumed power of the electric freezer 2b. The device operation setting value determination program of the third embodiment also causes a computer to execute a procedure to determine a setting value so that the difference between the actually measured consumed power of the electric freezer 2b and the consumed power target value of the electric freezer 2b calculated by the calculator 400 is within a prescribed range.

By this constitution, the calculator 400 calculates the consumed power target value of the electric freezer 2b, based on the relationship between the setting value regarding operation control of the electric freezer 2b and the consumed power of the electric freezer 2b. This enables the device operation setting apparatus 40 and the device operation setting value determination program of the third embodiment to make the difference between the actually measured value of cooling/warming heat of the electric freezer 2b and the cooling/warming heat target value of the electric freezer 2b be within a prescribed range.

The determiner 410 determines whether or not, by changing the setting value, it is possible to make the difference between the actually measured value of power of the electric freezer 2b and the calculated target value be within a prescribed range. If it is not possible to make the difference between the actually measured value of the electric freezer 2b and the calculated target value be within the prescribed range, the determiner 410 controls the heat storage tank 12 or the valve 13, via the controller 3, so that the difference is made to be within the prescribed range.

The device operation setting value determination program may be recorded in a computer-readable storage medium. The computer-readable storage medium is, for example, a removable medium, such as a flexible disk, an opto-magnetic disk, a ROM, a CD-ROM, or a flash memory, or a storage device such as a hard disk built into a computer system. The device operation setting value determination program may be transmitted via an electrical communication circuit.

According to at least one of the embodiments described above, a calculator calculates a target value of the consumed power of a device based on the relationship between a setting value regarding operation control of the device and the consumed power of the device, the difference between the actually measured value of consumed power of the device and the power target value of the device can be made to be within a prescribed range.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A control system comprising:
   a controller configured to determine a control value based on a setting value,
   a device configured to execute a prescribed operation based on the control value,
   a calculator configured to calculate a temporary consumed power value of the device, based at least in part on a relationship between a correction value and a consumed power value of the device, wherein the consumed power value is based on a temporary setting value,
   the temporary setting value is the setting value used by the calculator to calculate a target value, based on the device model,
   the temporary consumed power value is the consumed power value of the device for the case of operation in accordance with the temporary setting value, based on the device model,
   the device model represents the relationship between the target value of the power of the device, which operates in accordance with the setting value, and that setting value,
   a deterioration of the device is reflected in the device model,
   wherein the correction value is calculated based on the setting value previously outputted to the controller for the device and an actually measured value of consumed power of the device; and
   a determiner configured to adjust the temporary setting value to limit, within a prescribed range, a difference between a predetermined target value and the temporary consumed power value calculated by the calculator, and configured to determine the setting value for outputting to the controller,
   wherein the setting value for outputting to the controller is equal to the temporary setting value adjusted.

2. The control system according to claim 1, wherein the determiner is configured to adjust the temporary setting value so that the temporary setting value is within a first range.

3. The control system according to claim 2, wherein the determiner is configured to adjust the temporary setting value so that the calculated temporary consumed power value is within a second range.

4. The control system according to claim 3, wherein the determiner is configured to determine whether or not, by changing the temporary setting value, it is possible to make the difference between the actually measured value of consumed power of the device and the calculated temporary consumed power value to be within the prescribed range and, if it is not possible to make the difference between the actually measured value and the calculated target value to be within the prescribed range, the determiner controls another device, to cause the difference to be within the prescribed range.

5. The control system according to claim 4, wherein the device is an electric freezer; and
   wherein the other device is a heat storage tank.

6. The control system according to claim 2, wherein the determiner is configured to determine whether or not, by changing the temporary setting value, it is possible to make the difference between the actually measured value of consumed power of the device and the calculated temporary consumed power value to be within the prescribed range and, if it is not possible to make the difference between the actually measured value and the calculated target value to be within the prescribed range, the determiner controls another device, to cause the difference to be within the prescribed range.

7. The control system according to claim 6, wherein the device is an electric freezer; and
   wherein the other device is a heat storage tank.

8. The control system according to claim 1, wherein the determiner is configured to determine whether or not, by changing the temporary setting value, it is possible to make the difference between the actually measured value of consumed power of the device and the calculated temporary consumed power value to be within the prescribed range and, if it is not possible to make the difference between the actually measured value and the calculated target value to be within the prescribed range, the determiner controls another device, to cause the difference to be within the prescribed range.

9. The control system according to claim 8, wherein the device is an electric freezer; and
   wherein the other device is a heat storage tank.

10. A non-transitory computer readable storage medium that stores a computer program to control a device, the program being to cause a computer to perform at least:
    calculating a temporary consumed power value of the device, based at least in part on a relationship between a correction value and a consumed power value of the device,
    wherein the consumed power value is based on a temporary setting value,
    the temporary setting value is the setting value used by the calculator to calculate a target value, based on the device model,
    the temporary consumed power value is the consumed power value of the device for the case of operation in accordance with the temporary setting value, based on the device model,
    the device model represents the relationship between the target value of the power of the device, which operates in accordance with the setting value, and that setting value,
    a deterioration of the device is reflected in the device model,
    wherein the correction value is calculated based on a setting value previously outputted to a controller for the device and an actually measured value of consumed power of the device; and
    adjusting the temporary setting value to limit, within a prescribed range, a difference between a predetermined target value and the temporary consumed power value calculated, and determining the setting value for outputting to the controller, wherein the setting value for outputting to the controller is equal to the temporary setting value adjusted, the controller configured to determine a control value based on the setting value, the device configured to execute a prescribed operation based on the control value.

11. A control method comprising:

determining a control value based on a setting value, executing a prescribed operation based on the control value, calculating a temporary consumed power value of a device, based at least in part on a relationship between a correction value and a consumed power value of the device, wherein the consumed power value is based on a temporary setting value, the temporary setting value is the setting value used by a calculator to calculate a target value, based on the device model, the temporary consumed power value is the consumed power value of the device for the case of operation in accordance with the temporary setting value, based on the device model, the device model represents the relationship between the target value of the power of the device, which operates in accordance with the setting value, and that setting value, a deterioration of the device is reflected in the device model, wherein the correction value is calculated based on the setting value previously outputted to a controller for the device and an actually measured value of consumed power of the device; and adjusting the temporary setting value to limit, within a prescribed range, a difference between a predetermined target value and the temporary consumed power value calculated, and determining the setting value for outputting to the controller, wherein the setting value for outputting to the controller is equal to the temporary setting value adjusted.

* * * * *